(12) United States Patent
Yang

(10) Patent No.: US 11,818,678 B2
(45) Date of Patent: Nov. 14, 2023

(54) COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 52 days.

(21) Appl. No.: 17/167,638

(22) Filed: Feb. 4, 2021

(65) Prior Publication Data

US 2021/0160808 A1 May 27, 2021

Related U.S. Application Data

(63) Continuation of application No. PCT/CN2019/100507, filed on Aug. 14, 2019.

(30) Foreign Application Priority Data

Aug. 14, 2018 (CN) .......................... 201810923161.6

(51) Int. Cl.
| | |
|---|---|
| H04W 60/00 | (2009.01) |
| H04W 8/02 | (2009.01) |
| G16Y 10/75 | (2020.01) |
| H04W 84/04 | (2009.01) |
| H04W 88/06 | (2009.01) |

(52) U.S. Cl.
CPC .......... *H04W 60/005* (2013.01); *H04W 8/02* (2013.01); *G16Y 10/75* (2020.01); *H04W 84/042* (2013.01); *H04W 88/06* (2013.01)

(58) Field of Classification Search
CPC ... H04W 60/005; H04W 8/02; H04W 84/042; H04W 88/06; H04W 48/16; H04W 48/18;
(Continued)

(56) References Cited

U.S. PATENT DOCUMENTS

| 2011/0170481 A1* | 7/2011 | Gomes .................. H04W 48/20 |
| | | 370/328 |
| 2016/0057585 A1 | 2/2016 | Horn et al. |
| | | (Continued) |

FOREIGN PATENT DOCUMENTS

| CN | 101835241 A | 9/2010 |
| CN | 104427565 A | 3/2015 |
| | (Continued) | |

OTHER PUBLICATIONS

The international search report of PCT application No. PCT/CN2019/100507, dated Oct. 28, 2019.
(Continued)

*Primary Examiner* — Marisol Figueroa
(74) *Attorney, Agent, or Firm* — Ladas & Parry LLP

(57) ABSTRACT

A communication method, a terminal device and a network device are provided, where the method includes: the terminal device obtains instruction information, where the instruction information is sent by a core network device to the terminal device, where the instruction information is used to instruct the terminal device to communicate with network side through an access network device corresponding to a first radio access technology (RAT). Where the core network device is connected to access network devices corresponding to at least two RATs, the terminal device supports the at least two RATs, and the at least two RATs include the first RAT; and the terminal device communicates with the network side through the access network device corresponding to the first RAT thereby realizing the communication between the terminal device and the network side, and improving the flexibility of the communication between the terminal device and the network side.

13 Claims, 6 Drawing Sheets

(58) Field of Classification Search
CPC ... H04W 48/10; H04W 60/00; H04W 68/005; H04W 48/08; G16Y 10/75
See application file for complete search history.

(56) References Cited

U.S. PATENT DOCUMENTS

| | | | |
|---|---|---|---|
| 2016/0057723 A1* | 2/2016 | Horn | H04W 76/28 455/435.2 |
| 2016/0142963 A1 | 5/2016 | Salkintzis | |
| 2017/0086197 A1* | 3/2017 | Palamara | H04W 16/14 |
| 2018/0014247 A1 | 1/2018 | Chandramouli et al. | |
| 2018/0132141 A1 | 5/2018 | Huang-Fu et al. | |
| 2019/0059011 A1* | 2/2019 | Astrom | H04B 17/318 |
| 2019/0090173 A1 | 3/2019 | Xiao et al. | |
| 2020/0059832 A1* | 2/2020 | Wang | H04W 88/06 |
| 2020/0205121 A1* | 6/2020 | Yang | H04W 68/02 |

FOREIGN PATENT DOCUMENTS

| | | | |
|---|---|---|---|
| CN | 108024314 A | 5/2018 | |
| CN | 108307512 A | 7/2018 | |
| CN | 108702593 A | 10/2018 | |
| WO | 2017197649 A1 | 11/2017 | |
| WO | WO-2018174795 A1 * | 9/2018 | ............ H04W 68/12 |

OTHER PUBLICATIONS

3GPP TS 23.285 V14.7.0 (Jun. 2018); 3rd Generation Partnership Project; Technical Specification Group Services and System Aspects; Architecture enhancements for V2X services(Release 14).

3GPP TR 23.786 V0.7.0 (Jul. 2018); 3rd Generation Partnership Project; Technical Specification Group Services and System Aspects; Study on architecture enhancements for EPS and 5G System to support advanced V2X services (Release 16).

The first Office Action of corresponding European application No. 19850473., dated Mar. 10, 2022.

The first Office Action of corresponding Chinese application No. 202110096063.1, dated Mar. 29, 2022.

The EESR of corresponding European application No. 19850473., dated Aug. 27, 2021.

Motorola Mobility et al:"Service fallback in DR-mode of operation", 3GPP Draft; S2-178893_23501_DRmode_EPC_Fallback V02, 3rd Generation Partnership Project (3GPP), Mobile Competence Centre; 650, Route Des Lucioles; F-06921 Sophia-Antipolis Cedex; France, vol. SA WG2, No. Reno, Nevada; Nov. 27, 2017-Dec. 1, 2017 Nov. 21, 2017(Nov. 21, 2017), XP051379885.

The first Office Action of corresponding Indian application No. 202117004586, dated Sep. 22, 2021.

The Second Office Action of the parallel EP application No. 19850473.0, dated Jul. 1, 2022.

The Second Office Action of the parallel Chinese application No. 202110096063.1, dated Jun. 15, 2022.

"LTE; Evolved Universal Terrestrial Radio Access Network (E-UTRAN); S1 Application Protocol (S1AP) (3GPP TS 36.413 version 14.6.0 Release 14)",ETSI Technical Specification, European Telecommunications Standards Institute (ETSI), 650, Route Des Lucioles; F-06921 Sophia-Antipolis; France, vol. 3GPP RAN, No. V14.6.0 Jul. 4, 2018 (Jul. 4, 2018).

The third Office Action of corresponding European application No. 19850473.0, dated Dec. 1, 2022.

The fourth Office Action of corresponding European application No. 19850473.0, dated Jun. 12, 2023.

* cited by examiner

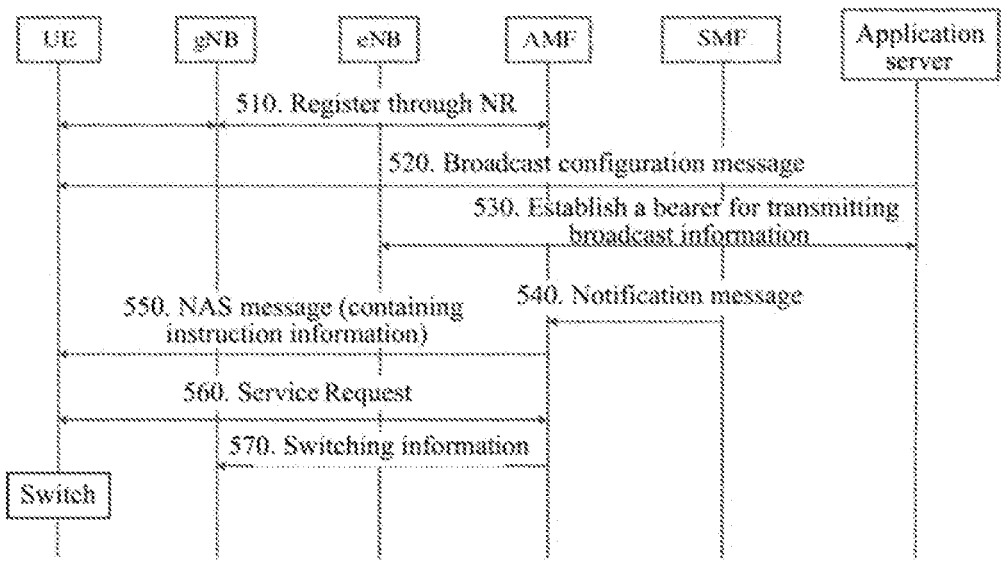

A core network device sends instruction information to a terminal device, where the instruction information is used to instruct the terminal device to communicate with network side through an access network device corresponding to a first RAT, where, the core network device is connected to access network devices corresponding to at least two RATs, and the at least two RATs include the first RAT
— 610

FIG. 6

COMMUNICATION METHOD, TERMINAL DEVICE AND NETWORK DEVICE

CROSS-REFERENCE TO RELATED APPLICATIONS

This application is a continuation of International Application No. PCT/CN2019/100507, filed on Aug. 14, 2019, which claims priority to Chinese Patent Application No. 201810923161.6, entitled "COMMUNICATION METHOD, TERMINAL DEVICE AND NETWORK DEVICE", filed on Aug. 14, 2018. The disclosures of the aforementioned applications are hereby incorporated by reference in their entireties.

TECHNICAL FIELD

The present disclosure relates to the field of communication technology and, in particular, relates to a communication method, a terminal device and a network device.

BACKGROUND

In a system of 5-Generation mobile communication technology (5-Generation, 5G), a terminal device may access a 5G core network device through an evolved universal terrestrial radio access network (E-UTRAN) or new radio (NR).

Therefore, when a terminal device can access a same core network device through access network devices corresponding to multiple radio access technologies (RATs), how the terminal device communicates with the network side is an urgent problem to be solved.

SUMMARY

Embodiments of the present disclosure provide a communication method, a terminal device and a network device, so that when a terminal device accesses a same core network device through access network devices corresponding to multiple RATs, the communication between the terminal device and the network side can be realized, and the flexibility of the communication between the terminal device and the network side can be improved.

In a first aspect, a communication method is provided, including: obtaining, by a terminal device, instruction information, where the instruction information is sent by a core network device to the terminal device, or the instruction information is pre-configured on the terminal device, where the instruction information is used to instruct the terminal device to communicate with network side through an access network device corresponding to a first radio access technology (RAT), where, the core network device is connected to access network devices corresponding to at least two RATs, the terminal device supports the at least two RATs, and the at least two RATs include the first RAT; and communicating, by the terminal device, with the network side by using the access network device corresponding to the first RAT.

In a second aspect, a communication method is provided, including: sending, by a core network device, instruction information to a terminal device, where the instruction information is used to instruct the terminal device to communicate with network side through an access network device corresponding to a first radio access technology (RAT), where, the core network device is connected to access network devices corresponding to at least two RATs, the terminal device supports the at least two RATs, and the at least two RATs include the first RAT.

In a third aspect, a communication method is provided, including: sending, by a core network device, instruction information to an access network device, where the instruction information is used to instruct a terminal device to communicate with network side through an access network device corresponding to a first radio access technology (RAT), where, the core network device is connected to access network devices corresponding to at least two RATs, the terminal device supports the at least two RATs, and the at least two RATs include the first RAT.

In a fourth aspect, a communication method is provided, including: receiving, by an access network device, instruction information sent by a core network device, where the instruction information is used to instruct a terminal device to communicate with network side through an access network device corresponding to a first radio access technology (RAT), where, the core network device is connected to access network devices corresponding to at least two RATs, the terminal device supports the at least two RATs, and the at least two RATs include the first RAT.

In a fifth aspect, a terminal device is provided, which is used to perform the method in the first aspect or in each implementation thereof.

Specifically, the terminal device includes function modules used to perform the method in the first aspect or in each implementation thereof.

In a sixth aspect, a core network device is provided, which is used to perform the method in the second aspect or in each implementation thereof.

Specifically, the core network device includes function modules used to perform the method in the second aspect or in each implementation thereof.

In a seventh aspect, a core network device is provided, which is used to perform the method in the third aspect or in each implementation thereof.

Specifically, the core network device includes function modules used to perform the method in the third aspect or in each implementation thereof.

In an eighth aspect, an access network device is provided, which is used to perform the method in the fourth aspect or in each implementation thereof.

Specifically, the access network device includes function modules used to perform the method in the fourth aspect or in each implementation thereof.

In a ninth aspect, a terminal device is provided, including a processor and a memory. The memory is configured to store a computer program, and the processor is configured to call and run the computer program stored in the memory to perform the method in the first aspect or in each implementation thereof.

In a tenth aspect, a core network device is provided, including a processor and a memory. The memory is configured to store a computer program, and the processor is configured to call and run the computer program stored in the memory to perform the method in the second aspect or in each implementation thereof.

In an eleventh aspect, a core network device is provided, including a processor and a memory. The memory is configured to store a computer program, and the processor is configured to call and run the computer program stored in the memory to perform the method in the third aspect or in each implementation thereof.

In a twelfth aspect, an access network device is provided, including a processor and a memory. The memory is configured to store a computer program, and the processor is configured to call and run the computer program stored in the memory to perform the method in the fourth aspect or in each implementation thereof.

In a thirteenth aspect, a chip is provided, which is used to implement the method in any of the first aspect to the fourth aspect or in each implementation thereof.

Specifically, the chip includes: a processor, configured to call a computer program from a memory and run the computer program, so that a device installed with the chip performs the method in any of the first aspect to the fourth aspect or in each implementation thereof.

In a fourteenth aspect, a computer readable storage medium is provided, configured to store a computer program, where the computer program causes a computer to perform the method in any of the first aspect to the fourth aspect or in each implementation thereof.

In a fifteenth aspect, a computer program product is provided, including computer program instructions, where the computer program instructions cause a computer to perform the method in any of the first aspect to the fourth aspect or in each implementation thereof.

In a sixteenth aspect, a computer program is provided, which when run on a computer, causes the computer to perform the method in any of the first aspect to the fourth aspect or in each implementation thereof.

Through the above-mentioned technical solutions, when a terminal device accesses a same core network device through access network devices corresponding to multiple RATs, the terminal device can determine, through instruction information, an access network device which is used to communicate with the network side, among multiple access network devices, thereby realizing the communication between the terminal device and the network side. In addition, the access network device is selected from multiple access network devices, which improves the flexibility of the communication between the terminal device and the network side.

BRIEF DESCRIPTION OF THE DRAWINGS

FIG. 5 is a specific schematic interaction diagram of another communication method provided in an embodiment of the present disclosure.

FIG. 6 is a schematic flowchart of a communication method provided in an embodiment of the present disclosure.

DETAILED DESCRIPTION OF THE EMBODIMENTS

With the drawings in the embodiments of the present disclosure, technical solutions in embodiments of the present disclosure will be described in the following part. Obviously, the described embodiments are part of embodiments of the present disclosure, rather than all of the embodiments. All other embodiments obtained by those skilled in the art based on the embodiments of the present disclosure without creative effort are within the protection scope of the present disclosure.

The technical solutions of embodiments of the present disclosure can be applied to various communication systems, such as a global system of mobile communication (GSM) system, a code division multiple access (CDMA) system, a wideband code division multiple access (WCDMA) system, a general packet radio service (GPRS) system, a long term evolution (LTE) system, a LTE frequency division duplex (FDD) system, a LTE time division duplex (TDD) system, a universal mobile telecommunication system (UMTS), a worldwide interoperability for microwave access (WiMAX) communication system, a 5G system, or a communication system of a subsequent version.

Figure 1:
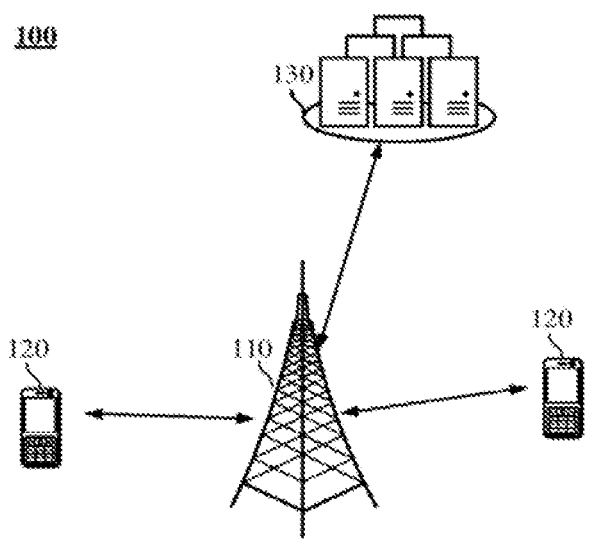
FIG. 1 is a schematic diagram of a communication system architecture provided in an embodiment of the present disclosure.

FIG. 1 shows a radio communication system 100 applied in an embodiment of the present disclosure. The radio communication system 100 may include an access network device 110. The access network device 110 may be a device which communicates with a terminal device. The access network device 110 can provide communication coverage for a specific geographic area and can communicate with terminal devices located in the coverage area. In an implementation, the access network device 110 may be a next generation radio access network (NG RAN) device, or a base station in a NR system (gNB), or a radio controller in a cloud radio access network (CRAN), or the access network device 110 may be a mobile switching center, a relay station, an access point, an in-vehicle device, a wearable device, a hub, a switch, a bridge, a router, a network side device in a 5G network or a network device in a future evolved public land mobile network (PLMN). In an implementation, the access network device 110 may also be a base station in a LTE system, for instance, an EL-UTRAN device.

The radio communication system 100 may further include at least one terminal device 120 located within the coverage area of the access network device 110. The terminal device 120 may be mobile or fixed. In an implementation, the "terminal device" used herein includes but is not limited to being connected via a wire line, such as being connected via a public switched telephone network (PSTN), a digital subscriber line (DSL), a digital cable or a direct cable; and/or being connected via another data network; and/or being connected via a radio interface, such as a cellular network, a wireless local area network (WLAN), a digital TV network such as a Digital Video Broadcasting-Handheld (DVB-H) network, a satellite network or an Amplitude Modulation-Frequency Modulation AM-FM broadcast transmitter, and/or being connected via an apparatus of another terminal device which is configured to receive/send a communication signal; and/or being connected via an Internet of Things (internet of Things, IoT) device. The terminal device which is configured to communicate through a radio interface may be referred to as a "radio communication terminal", a "radio terminal" or a "mobile terminal". Examples of the mobile terminal includes, but is not limited to, a satellite or a cellular telephone; a personal communications system (PCS) terminal which can combine a cellular radio telephone and capabilities of data processing, fax and data communication; a Personal Digital Assistant (PDA) which may include a radio telephone, a pager, internet/intranet access, a Web browser, a notebook, a calendar, a receiver of a BeiDou Navigation Satellite System (BDS) and a receiver of a Global Positioning System (GPS); a conventional laptop and/or palmtop receiver, or other electronic device including a radio telephone transceiver. The terminal device may refer to an access terminal, a user equipment (UE), a user unit, a user station, a mobile station, a mobile platform, a remote station, a remote terminal, a mobile device, a user terminal, a terminal, a radio communication device, a user agent or a user device. The access terminal may be a cellular telephone, a cordless telephone, a session initiation protocol (SIP) telephone, a wireless local loop (WLL) station, a personal digital assistant (PDA), a handheld device with a function of radio communication, a computing device or other processing device connected to a wireless modem, an in-vehicle device, a wearable device, a terminal device in a 5G network or a terminal device in a future evolved PLMN.

The radio communication system 100 further includes a core network device 130 which communicates with the access network device. In an implementation, the core network device 130 may be a 5G core network device, for instance, an access and mobility management function (AMF), which is responsible for access and mobility management, and has functions such as user authentication, handover, location update. For another instance, the core network device 130 may be a session management function (SMF), which is responsible for session management, including establishing, modification and release of a packet data unit (Packet Data Unit, PDU) session. For another instance, the core network device 130 may be a user plane function (UPF), which is responsible for forwarding of user data.

In an implementation, device to device (D2D) communication may be performed between terminal devices.

FIG. 1 exemplarily shows an access network device, a core network device and two terminal devices. In an implementation, the radio communication system 100 may include multiple access network devices, and in the coverage area of each access network device, other number of terminal devices may be included, which are not limited in the embodiment of the present disclosure.

In an implementation, the radio communication system 100 may further include other network entity such as a mobile management entity (MME), a unified data management (UDM), an authentication server function (AUSF), a user plane function (UPF), a signaling gateway (SGW), which are not limited in the embodiment of the present disclosure.

Figure 2:
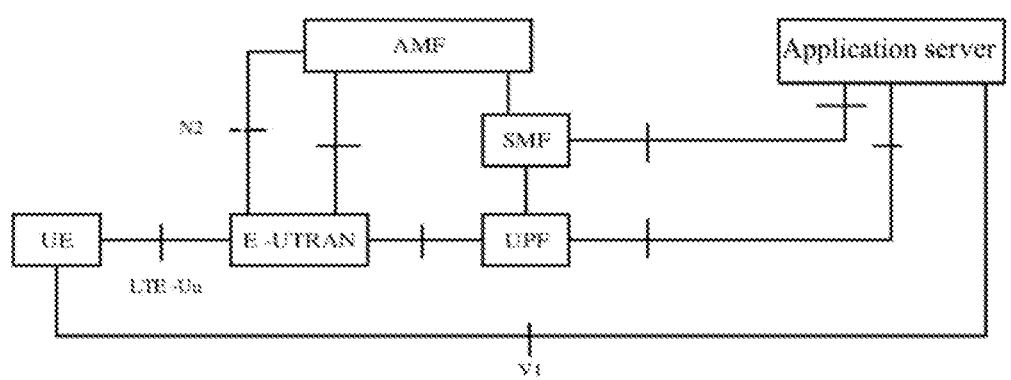
FIG. 2 is a schematic diagram of a communication system architecture provided in an embodiment of the present disclosure.

FIG. 2 is a possible system architecture diagram applying the embodiment of the present disclosure. It can be seen that, in the system, the access network device is a 4G access network device, the core network device is a 5G core network device, the interface between the AMF and the E-UTRAN is N2, the interface between the E-UTRAN and the UE is LTE-Uu, and the interface between the application server and the UE is V1. When the application server sends broadcast information to the UE, the application server may send the broadcast information to the E-UTRAN, after that, the E-UTRAN may broadcast the received information by using a broadcast channel.

At the same time, the UE may obtain a service identity (service ID) and a corresponding temporary mobile group identity (TMGI) according to multimedia broadcast/multicast service (MBMS) information configured by the application server or the 5G core network device. The UE then obtains, from system broadcast information, a radio resource of the broadcast channel corresponding to the TMGI, thus receives broadcast information on the broadcast channel.

In a 5G system, a terminal device can access a 5G core network device through access network devices corresponding to the multiple RATs, such as a 4G access network device, a 5G access network device. There is currently no clear regulation that when a terminal device access a same core network device through access network devices corresponding to multiple RATs, how the terminal device communicates with a network device. In view of this, the embodiment of the present disclosure provides a technical solution, which can realize the communication between a terminal device and a network device when the terminal device access a same core network device through access network devices corresponding to multiple RATs.

Figure 3:
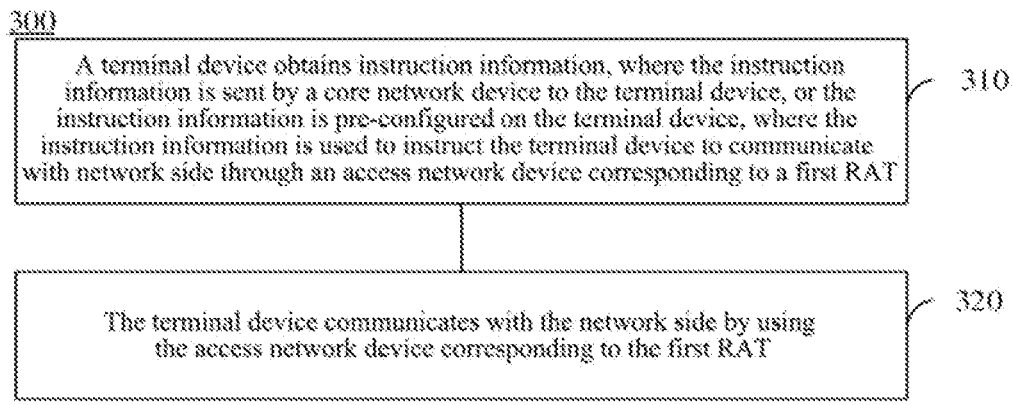
FIG. 3 is a schematic flowchart of a communication method provided in an embodiment of the present disclosure.

FIG. 3 is a schematic flowchart of a communication method 30 according to an embodiment of the present disclosure. The method 300 includes at least part of the following content.

It should be understood that, the embodiment of the present disclosure may be applied to IoT. IoT is an important part of the development of information technology in the future. Its main technical feature is to connect objects to the network through communication technology to realize the intelligent network of human-machine interconnection and interconnection of things.

Of course, the embodiments of the present disclosure may also be applied to communication scenarios such as V2X, telemedicine, smart city, smart home. It should be understood that, in V2X commination, X can generally refer to any device with radio receiving and sending capabilities, such as but not limited to an application server, a slow-moving radio device, a quick-moving in-vehicle device, or a network control node with radio transmitting and receiving capabilities.

The embodiments of the present disclosure will be described in further detail in the following part.

In 310, a terminal device obtains instruction information, where the instruction information is sent by a core network device to the terminal device, or the instruction information is pre-configured on the terminal device, where the instruction information is used to instruct the terminal device to communicate with network side through an access network device corresponding to a first RAT.

In an implementation, the core network device may be connected to access network devices corresponding to at least two RATs, and the terminal device supports the at least two RATs.

Where, the at least two RATs include the first RAT, the at least two RATs include but are not limited to evolved-universal mobile telecommunications system terrestrial radio access network (E-UTRAN) and NR, and the core network device may be a 3G core network device, a 4G core network device or a 5G core network device.

For instance, when a 5G core network device is connected to a 5G access network device, it can also be connected to a 4G access network device.

Alternatively, the terminal device may be registered with a 5G core network device through a 5G access network device, after that, the connection between the 5G access network device and the 5G core network device may be switched to the connection between a 4G access network device and the 5G core network device.

In an implementation, the core network device may also only be connected to an access network device corresponding to one RAT.

For instance, the terminal device is registered with a 5G core network device through a 5G access network device, after that, the terminal device communicates through the 5G access network device.

In the embodiment of the present disclosure, the terminal device communicates with the network side through the access network device corresponding to the first RAT, which may include: the terminal device receives information sent by the network side through the access network device corresponding to the first RAT, or the terminal device sends information to the network side through the access network device corresponding to the first RAT In an implementation, the network side may be an application server. That is to say, the information received by the terminal device may be a message from the application layer.

For instance, when the embodiment of the present disclosure is applied to a communication scenario of V2X, the information may be there is a red light in front, how long will the red light turn green, a relatively crowed road section, and so on.

For another instance, when the embodiment of the present disclosure is applied to IoT, such as in a mall, the information may be the discount of each brand in the mall, the location of each brand in the mall, and so on.

For another instance, when the embodiment of the present disclosure is applied to telemedicine, the information may be a diagnosis result of a certain patient's condition, a prescription based on a diagnosis result, and so on.

For another instance, when the embodiment of the present disclosure is applied to smart home, the information may be residual remaining amount of natural gas, water and electricity at home, whether a light at home is turned off after going out, and so on.

It should be understood that the information may be broadcast information sent by the application server, and may also be information sent by the application server to a specific terminal device, which are not limited in the embodiment of the present disclosure.

It should be noted that, the embodiment of the present disclosure only takes that the core network device is connected to access network devices corresponding to E-UTRA and NR and the terminal device receives broadcast information through an access network device corresponding to the first RAT as an example to explain, but it should be understood that the present disclosure is not limited to this.

As an example, the terminal device obtains the instruction information, which may include: the terminal device receives the instruction information sent by the core network device.

In an implementation, when the core network device is an application server, the terminal device receives the instruction information sent by the core network device, which may include: the terminal device receives the instruction information sent by the application server through an interface between the terminal device and the application server.

Alternatively, the terminal device receives the instruction information sent by the core network device, which may include: the terminal device receives the instruction information sent by the application server through a SMF.

In an implementation, when the core network device is a SMF, the terminal device receives the instruction information sent by the core network device, which may include: the terminal device receives the instruction information sent by the SMF through an AMF.

In an implementation, when the core network device is an AMF, the terminal device receives the instruction information sent by the core network device, which may include: the AMF receives the instruction information sent by a SMF, after that, the terminal device receives the instruction information sent by the AMF through at least one access network device. Where, the at least one access network device includes the access network device corresponding to the first RAT.

The at least one access network device may be all access network devices corresponding to the first RAT in an registered area of the terminal device, or may be all access network devices in the registered area of the terminal device.

In an implementation, when the core network device is a V2X control function (CF), the terminal device receives the instruction information sent by the core network device, which may include: the terminal device receives the instruction information through the V2X CF. Where, the V2X CF is used to configure configuration information related to the communication system for the terminal device.

In an implementation, the V2X CF may send the instruction information to the terminal device through signaling.

In an implementation, the V2X CF may send the instruction information to the terminal device through a data packet. For instance, the V2X CF may carry the instruction information in an Internet Protocol (IP) packet through which the networks interconnect.

In an implementation, when the core network device is a policy control function (PCF), the terminal device receives the instruction information sent by the core network device, which may include: the terminal device receives the instruction information through the PCF. Specifically, the PCF may send the instruction information to an AMF, and the AMF sends the instruction information to the terminal device after receiving the instruction information.

In an implementation, the PCF may send the instruction information to the terminal device through signaling.

As another example, the terminal device obtains the instruction information, which may include: the access network device corresponding to the first RAT receives the instruction information sent by the AMF, and then the terminal device receives the instruction information sent by the access network device corresponding to the first RAT.

In the embodiment of the present disclosure, the instruction information may be carried in a broadcast configuration message. The broadcast configuration message may further include but is not limited to a service ID, a TMGI corresponding to the service ID, a frequency band, and an area where the terminal device communicates with the network side, i.e., the area where the terminal device receives broadcast information by using the access network device corresponding to the first RAT.

Where, the TMGI can be used to determine a physical resource used by the terminal device to receive broadcast information.

Where, the frequency band may include a frequency band of a 4G system or a frequency band of a 5G system. The terminal device can determine the access network device used to receive broadcast information by determining whether the frequency band is a frequency band of a 4G system or a frequency band of a 5G system.

For example, if the frequency band is a frequency band of a 4G system, the terminal device can determine to use a 4G access network device to receive broadcast information.

Where, the area where the access network device corresponding to the first RAT receives broadcast information may include: an area where the terminal device can receive the broadcast information under a 4G access network device such as E-UTRAN, if the access network device corresponding to the first RAT is a 4G access network device; or an area where the terminal device can receive the broadcast information under a 5G access network such as NR, if the access network device corresponding to the first RAT is a 5G access network device.

The area where the terminal device communicates with the network side in the embodiment of the present disclosure may be represented as an area covered by the access network device corresponding to the first RAT or a tracking area (TA).

Specifically, the terminal device may determine the access network device corresponding to the first RAT according to at least one of an ID list, a cell ID list and a global positioning system (GPS) position, of the access network device corresponding to the first RAT. After determining the access network device corresponding to the first RAT, the terminal device may determine the area where the terminal device communicates with the network side based on the area covered by the access network device corresponding to the first RAT.

It should be understood that, the service ID may be included in the broadcast configuration message and the TMGI and frequency band may not be included. Since the service ID has a corresponding relationship with the TMGI and the frequency band respectively, the terminal device can obtain the TMGI and the frequency band corresponding to the service based on the service ID.

As another example, the instruction information may be pre-configured on the terminal device.

When the instruction information is pre-configured on the terminal device, the terminal device can obtain the instruction information before registering with the core network device.

In an implementation, the instruction information may be preset by the system or the user.

Exemplarily, the system or the user may preset that the terminal device receives broadcast information by using the access network device corresponding to the first RAT.

For another example, the system or the user may preset that the terminal device receives broadcast information by using the access network device corresponding to the first RAT during the first 12 hours of each day, and receives broadcast information by using an access network device corresponding to a second RAT during the last 12 hours of each day.

It should be noted that if the terminal device does not obtain the instruction information through pre-configuration, the terminal device may register with the core network first, and then obtain the instruction information.

In the embodiment of the present disclosure, the terminal device may determine the access network device used for receiving broadcast information, based on some parameters of access network devices in a preset area where the terminal device is currently located.

Where, the parameters may include, but are not limited to, channel quality, service traffic, and quantity.

For example, the terminal device may determine to receive broadcast information by using an access network device with the best channel quality in the preset area where the terminal device is located. For instance, if the channel quality of the access network device corresponding to the first RAT in the preset area where the terminal device is currently located is the best, the terminal device may determine to receive broadcast information by using the access network device corresponding to the first RAT. For another instance, if the channel quality of the access network device corresponding to the second RAT in the preset area where the terminal device is currently located is the best, the terminal device may determine to receive broadcast information by using the access network device corresponding to the second RAT.

In 320, the terminal device communicates with the network side by using the access network device corresponding to the first RAT.

Specifically, the terminal device may obtain, from system information, a resource of the broadcast channel corresponding to the TMGI, and then the terminal device may receive broadcast information on the broadcast channel by using the access network device corresponding to the first RAT.

In the embodiment of the present disclosure, the terminal device communicates with the network side by using the access network device corresponding to the first RAT, which may include: the terminal device determines an area for receiving broadcast information, where the area includes at least one access network device corresponding to the first RAT, and the terminal device receives broadcast information by using one of the at least one access network device.

In an implementation, the terminal device may determine the area for receiving broadcast information based on pre-configuration or a first message sent by the core network device.

Where, the first message may be used to indicate the area where the terminal device communicates with the network side. The first message may be a message containing the instruction information, i.e., a broadcast configuration message; or, the first message may also be a message other than the broadcast configuration message.

In an implementation, the first message indicates the area where the terminal device communicates with the network side, which may include: the first message may include the area where the terminal device communicates with the network side; or the first message may implicitly indicate the area where the terminal device communicates with the network side, for instance, the first message may include but is not limited to the ID list, the cell ID list of the access network device corresponding to the first RAT, based on which, the terminal device can determine the area where the terminal device communicates with the network side.

It should be noted that, when the first message is a message other than the broadcast configuration message, the embodiments of the present disclosure does not specifically limit the order in which the terminal device receives the broadcast configuration message and the first message. For example, the terminal device may first receive the broadcast configuration message, and then receive the first message; it may also receive the first message first, and then receive the broadcast configuration message. It should be understood that, the context between the broadcast configuration message and the first message in the embodiment of the present disclosure only represents a logical context, there may be other messages between the broadcast configuration message and the first message, such as a second message, and certainly, there may be no other message, which is not limited in the embodiments of the present disclosure.

When there are multiple access network devices corresponding to the first RAT in the area where the terminal device receives broadcast information, the terminal device may select an access network device from the multiple access network devices. In an implementation, the terminal device may randomly select an access network device among the multiple access network devices.

Alternatively, the terminal device may select the access network device closest to itself among the multiple access network devices.

In an implementation, the terminal device may select the access network device with the least service at the current moment among the multiple access network devices.

Specifically, the terminal device may send information that determines service traffics of the multiple access network devices at the current moment to a network device, and after receiving the information, the network device determines the service traffic of each access network device among the multiple access network devices at the current moment. Then, the network device may send service information to the terminal device, and the service information includes the service traffic of each access network device at the current moment. The terminal device selects, based on the service information, the access network device with the least service at the current moment. Alternatively, the service information sent by the network device to the terminal device may only indicate the access network device with the least service at the current moment, and the terminal device selects, based on the service information, the access network device with the least service at the current moment.

Alternatively, the terminal device may perform channel quality measurement on the multiple access network devices, and select the access network device among the multiple access network devices based on a measurement result. For example, the terminal device may select the access network device with the best channel quality.

In an implementation, the terminal device may select the access network device with the best channel quality among multiple access network devices based on channel quality indicator (CQI).

It should be noted that, if the terminal device selects the access network device with the best channel quality to receive broadcast information, when there are multiple access network devices with the best channel quality, the terminal device may randomly select an access network device among the access network devices with the best channel quality, may also select the closest access network device among the access network devices with the best channel quality, and certainly, may also select the access network device with the least service at the current moment among the access network devices with the best channel quality, and the specific implementation is not specifically limited in the embodiment of the present disclosure.

In the embodiment of the present disclosure, before 320, the method may further include:

when a RAT corresponding to an access network device currently serving the terminal device is not the first RAT, the terminal device may perform switching or establish a connection with the access network device corresponding to the first RAT, to connect to the access network device corresponding to the first RAT.

For example, if the terminal device receives broadcast information by using a 4G access network device, the access network device currently serving the terminal device is a 5G access network device, and the terminal device is in a connected state, then the 5G access network device may trigger the terminal device to perform switching to switch from the connection between the 5G access network device and the terminal device to the connection between the 4G access network device and the terminal device.

For the process in which the 5G access network device triggers the terminal device to perform switching, specifically, when the terminal device is currently in the connected state, the AMF may send switching information to the access network device corresponding to the second RAT, where the switching information is used to instruct the access network device corresponding to the second RAT to trigger the terminal device to switch from the access network device corresponding to the second RAT to the access network device corresponding to the first RAT.

After receiving the switching information, the access network device corresponding to the second RAT may send measurement configuration information to the terminal device, where the measurement configuration information may include measurement parameters, such as a list of cells to be measured, measurement quantity and a threshold value, which are used by the terminal device for measuring cells in the area of the access network device corresponding to the first RAT. In an implementation, the measurement quality may include at least one of the following: reference signal received power (RSRP), reference signal receiving quality (RSRQ), reference signal-signal to interference plus noise ratio (RS-SINR).

The terminal device measures cells in the area of the access network device corresponding to the first RAT according to the measurement parameters to obtain a measurement result, and then reports the measurement result to the access network device corresponding to the second RAT. The access network device corresponding to the second RAT may select a target cell based on the measurement result, so that the terminal device can switch from the area of the access network device corresponding to the second RAT to the area of the access network device corresponding to the first RAT. Thereafter, the terminal device may receive broadcast information by using the access network device corresponding to the first RAT.

For the process of establishing a connection between the terminal device and the access network device corresponding to the first RAT, specifically, when the terminal device is in an idle state, the terminal device may send a radio resource control (RRC) connection establishment request to the access network device corresponding to the first RAT, to establish a connection between the terminal device and the access network device. Where, the terminal device may establish the connection with the access network device corresponding to the first RAT through random access.

It should be noted that, the terminal device can determine, according to the system information, the resource of the broadcast channel for receiving broadcast information, and then receive broadcast information on the broadcast channel. Therefore, when the terminal device is in the idle state, if the terminal device has no other service transmission with the network device except for receiving broadcast information, the terminal device may not establish the connection corresponding to the first RAT.

In the embodiment of the present disclosure, if the RAT corresponding to the access network device currently serving the terminal device is the first RAT, the access network device corresponding to the first RAT may not trigger the terminal device to perform switching, and then the terminal device can receive broadcast information by using the access network device currently serving the terminal device.

In an implementation, if the RAT corresponding to the access network device currently serving the terminal device is the first RAT, but the channel quality of the access network device currently serving the terminal device is not the best among the multiple access network devices corresponding to the first RAT, the access network device corresponding to the first RAT may trigger the terminal device to perform switching to switch to the area of the access network device corresponding to the first RAT with the best channel quality.

In a possible embodiment, when the terminal device enters the idle state before registering to the core network or after registering to the core network, the terminal device may select the access network device corresponding to the first RAT when selecting a RAT, to receive broadcast information.

For example, if the first RAT is E-UTRA, the terminal device may select E-UTRAN when selecting a RAT, and after selecting, receive broadcast information by using the broadcast channel of E-UTRAN.

For another example, if the first RAT is NR, the terminal device may select NR when selecting a RAT, and after selecting, receive broadcast information by using the broadcast channel of NR.

In the embodiment of the present disclosure, the terminal device communicates with the network side by using the access network device corresponding to the first RAT, which may include: after obtaining the instruction information, the terminal device only selects the access network device corresponding to the first RAT to communicate with the network side.

In an implementation, after obtaining the instruction information, the terminal device only selects the access network device corresponding to the first RAT to communicate with the network side, which may be understood as: after obtaining the instruction information, the terminal device may only use the access network device corresponding to the first RAT to communicate with the network side, based on the instruction information or in response to the instruction information; or, while maintaining communication with the access network device corresponding to the second RAT, the terminal device only selects the access network device corresponding to the first RAT to communicate with the network side.

In the implementation, the terminal device only uses the access network device corresponding to the first RAT to communicate with the network side, which may include: the terminal device only selects the access network device corresponding to the first RAT, and only uses the selected access network device corresponding to the first RAT to communicate with the network side.

While maintaining communication with the access network device corresponding to the second RAT, the terminal device only selects the access network device corresponding to the first RAT to communicate with the network side, which may include: the terminal device only selects the access network device corresponding to the first RAT, and after selecting the access network device corresponding to the first RAT, the terminal device may use the selected access network device corresponding to the first RAT to communicate with the network side while maintaining the communication with the access network device corresponding to the second RAT.

As an example, during a time period from a moment when the terminal device receives the instruction information to a moment when the terminal device is instructed to use an access network device corresponding to a RAT other than the first RAT to communicate with the network side, the terminal device may only select the access network device corresponding to the first RAT to establish a connection with the network side, thereby communicating with the network side.

That is to say, during the time period from the moment when the terminal device receives the instruction information to the moment when the terminal device is instructed to use the access network device corresponding to the second RAT to communicate with the network side, if there are multiple communications between the terminal device and the network side in the time period, the terminal device may only select the access network device corresponding to the first RAT to communicate with the network side for the multiple communications.

As another example, after obtaining the instruction information, the terminal device may always only select the access network device corresponding to the first RAT to communicate with the network side.

In the embodiment of the present disclosure, in the process that the terminal device only selects the access network device corresponding to the first RAT to communicate with the network side, the access network device corresponding to the first RAT may be the same access network device or different access network devices.

For example, during the time period from the moment when the terminal device receives the instruction information to the moment when the terminal device is instructed to use the access network device corresponding to the second RAT to communicate with the network side, in a first communication, the terminal device may select an access network device A corresponding to the first RAT to establish a connection with the network side, in a second communication, the terminal device may select an access network device B corresponding to the first RAT to establish a connection with the network side, and in a third communication, the terminal device may select the access network device B corresponding to the first RAT to establish a connection with the network side.

In another possible embodiment, while maintaining communication with the access network device corresponding to the second RAT, the terminal device may use the access network device corresponding to the first RAT to receive broadcast information.

The at least two RATs in the embodiment of the present disclosure include the second RAT.

It should be understood that, in the embodiment of the present disclosure, the "first" and the "second" are only used to distinguish different objects, but do not limit the scope of the embodiment of the present disclosure.

As an example, the terminal device may include multiple antennas.

Exemplarily, the terminal device may include two antennas, where when one antenna communicates with the access network device corresponding to the second RAT, the other antenna may use the access network device corresponding to the first RAT to receive broadcast information.

At this time, the two antennas of the terminal device are independent.

As an example, the radio frequency antenna of the terminal device may support dual reception.

Exemplarily, when the first RAT is 4G and the second RAT is 5G, at this time, the terminal device may use NR at the Uu port while using a set of receivers to receive broadcast information sent by the network device by using E-UTRAN.

In an implementation, the frequency band in which the terminal device communicates with the access network device corresponding to the second RAT is different from the frequency band used by the terminal device to receive broadcast information from the access network device corresponding to the first RAT.

In an implementation, the air domain in which the terminal device communicates with the access network device corresponding to the second RAT is different from the air domain used by the terminal device to receive broadcast information from the access network device corresponding to the first RAT.

In an implementation, the code domain in which the terminal device communicates with the access network device corresponding to the second RAT is different from the code domain used by the terminal device to receive broadcast information from the access network device corresponding to the first RAT.

At this time, the terminal device may receive broadcast information in an idle state, or may receive broadcast information in a connected state, which is not specifically limited in the embodiment of the present disclosure.

It should be understood that, in the implementation, before the terminal device receives broadcast information by using the access network device corresponding to the first RAT, the terminal device may determine, according to the instruction information, that the access network device receiving broadcast information is the access network device corresponding to the first RAT, and the terminal device may also determine, according to a system preset or a user preset, that the access network device receiving broadcast information is the access network device corresponding to the first RAT. Certainly, the terminal device may also determine, according to some parameters of the access network device at the current moment, that the access network device receiving broadcast information is the access network device corresponding to the first RAT.

In the embodiment of the present disclosure, while maintaining communication with the access network device corresponding to the second RAT, the terminal device may also receive broadcast information by using the access network device corresponding to the second RAT; or while maintaining communication with the access network device corresponding to the first RAT, the terminal device may also receive broadcast information by using the access network device corresponding to the first RAT, which is not specifically limited in the embodiment of the present disclosure.

It should be understood that various implementations of the embodiment of the present disclosure may be implemented individually or in combination, which is not limited in the embodiment of the present disclosure.

For example, in the embodiment of the present disclosure, the implementation that the terminal device may receive broadcast information by using the access network device corresponding to the first RAT while maintaining communication with the access network device corresponding to the second RAT and the implementation that the instruction information may be included in a paging message when the terminal device is in an idle state may be implemented individually or in combination. The following separately describes the implementation that the instruction information may be included in a paging message when the terminal device is in an idle state. It should be understood that, in addition to the following description, the following embodiment may also refer to the related descriptions in the previous embodiments, and it will not be described in the following for brevity.

In another possible embodiment, when the terminal device is in an idle state, the instruction information may be included in a paging message received by the terminal device.

In an implementation, the paging message may be from the access network device corresponding to the first RAT.

In an implementation the paging message may also be from the access network device corresponding to the second RAT, at this time, the paging message may instruct the terminal device to receive broadcast information from the access network device corresponding to the first RAT.

In an implementation, when the AMF determines that the terminal device is in an idle state, the AMF may send a first paging message to at least one access network device in the registration area of the terminal device, where, the first paging message includes the instruction information, and the at least one access network device includes the access network device corresponding to the first RAT.

It should be understood that, the at least one access network device that receives the first paging message may be all access network devices in the registration area of the terminal device, or just all access network devices corresponding to the first RAT in the registration area of the terminal device.

After receiving the first paging message, the access network device may send a second paging message to the terminal device, and the second paging message also includes the instruction information. After the terminal device receives the second paging message and determines that there is broadcast information to be received, the terminal device may select an access network device corresponding to the first RAT to receive the broadcast information.

When the terminal device receives the second paging message, as an example, if the terminal device is in the area of the access network device corresponding to the first RAT at this time, in an implementation, the terminal device may receive broadcast information by using the access network device corresponding to the first RAT.

Alternatively, if at this time, the access network device corresponding to the first RAT in which the terminal device is located has a poor channel quality or has many services, the terminal device may also select other access network device corresponding to the first RAT to receive broadcast information.

It should be understood that, the implementation that the terminal device selects the access network device from multiple access network devices corresponding to the First RAT has been described in detail in previous contents, and the detailed description is omitted herein to avoid redundant description.

In an implementation, when the terminal device receives the second paging message, as an example, if the terminal device is in the area of the access network device corresponding to the second RAT at this time, the terminal device may enter a connected state. After that, the access network device corresponding to the second RAT may trigger the terminal device to perform switching to switch from the area of the access network device corresponding to the second RAT to the area of the access network device corresponding to the first RAT.

It should be noted that, the terminal device may register with the core network through the access network device corresponding to the second RAT, and may also register with the core network through the access network device corresponding to the first RAT, which is not limited in the disclosure.

Figure 4:
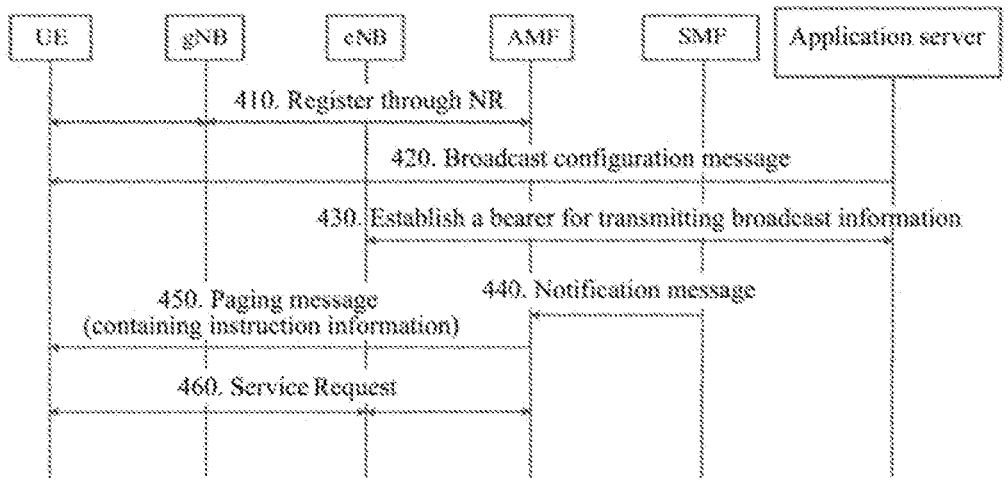
FIG. 4 is a specific schematic interaction diagram of a communication method provided in an embodiment of the present disclosure.

FIG. 4 provides a specific schematic diagram of an embodiment of the present disclosure. In FIG. 4, the terminal device is the UE, the access network device corresponding to the first RAT is the access network device (eNB) in the LTE system, and the access network device corresponding to the second RAT is the gNB.

In 410, the UE registers with the 5G core network through NR.

In 420, the application server sends a broadcast configuration message to the UE.

Where, the broadcast configuration message may include: a service ID, a TMGI corresponding to the service ID, a frequency band, an area where broadcast information of the service can be received under E-UTRAN, and an area where broadcast information of the service can be received under NR.

In 430, a bearer for transmitting broadcast information is established between the application server and the eNB.

Where, in the process of establishing a bearer for transmitting broadcast information, the application server may notify the SMF that there is broadcast information to be sent to the UE and the UE identity (UE ID) of the UE receiving the broadcast information.

In 440, the SMF sends a notification message to the AMF.

Where, the notification message may include information that distinguishes the UE, the instruction information, and an area where the UE can receive broadcast information. Where, the information that distinguishes the UE may include, but is not limited to, the identity of the UE, such as an international mobile subscriber identification number (IMSI), UE ID.

Where, the AMF can determine, through the UE ID, the UE receiving broadcast information. The area where the UE can receive the broadcast information may include an area where the UE receives the broadcast information by using E-UTRAN and an area where the UE receives the broadcast information by using NR. Alternatively, the area where the UE can receive the broadcast information may also include only the area where the UE receives the broadcast information by using E-UTRAN.

In 450, the AMF determines whether the UE is in an idle state, and if the UE is in an idle state, the AMF sends a paging message to the UE, and the paging message contains the instruction information.

Specifically, the AMF may send a first paging message to the eNB and gNB first, and the eNB and gNB then send a second paging message to the UE; or, the AMF may send the first paging message to the eNB first, and the eNB then sends a second paging message to the UE. Where, the area where the AMF sends the first paging message belongs to both the area where the UE can receive the broadcast information and the registration area of the terminal device.

In 460, the UE sends a Service Request to the AMF.

Specifically, after the UE receives the second paging message and determines that there is broadcast information to be received, the UE may select an eNB to receive the broadcast information according to the second paging message.

In an implementation, if the UE has other service transmissions with the eNB in addition to receiving the broadcast information, the UE may send a service request to the AMF through the eNB to establish a connection between the UE and the eNB.

It should be understood that, the specific examples in the embodiment of the present disclosure are only intended to help those skilled in the art to better understand the embodiment of the present disclosure, rather than limiting the scope of the embodiment of the present disclosure.

In another possible embodiment, when the terminal device is in a connected state, the instruction information may be contained in a non-access stratum (NAS) message sent by the core network device.

In an implementation, when the AMF determines that the terminal device is in a connected state, the AMF may send a NAS message to the terminal device, where the NAS message contains the instruction information.

If the terminal device registers with the core network through the access network device corresponding to the first RAT, the terminal device may receive broadcast information by using the access network device corresponding to the first RAT which registers with the core network.

Alternatively, if the terminal device registers with the core network through the access network device corresponding to the second RAT, and if the terminal device can receive broadcast information at the current moment, the terminal device may send a Service Request to the AMP to inform the AMF that the terminal device can receive broadcast information, then the AMF may send switching information to the access network device corresponding to the second RAT, and the switching information is used to instruct the access network device corresponding to the second RAT to trigger the terminal device to switch from the area of the access network device corresponding to the second RAT to the area of the access network device corresponding to the first RAT.

After receiving the switching information, the access network device corresponding to the second RAT may send measurement configuration information to the terminal device. The terminal device measure the cell in the area of the access network device corresponding to the first RAT based on the measurement configuration information, and after obtaining the measurement result, the terminal device reports the measurement result to the access network device corresponding to the second RAT. The access network device corresponding to the second RAT may select an access network device corresponding to the first RAT based on the measurement result, so that the terminal device can receive broadcast information by using the access network device corresponding to the first RAT.

It should be noted that, the terminal device may switch to the access network device corresponding to the first RAT without receiving the NAS message and sending the Service Request to the AMF.

FIG. 5 provides a specific schematic diagram of an embodiment of the present disclosure. In FIG. 5, the terminal device is the UE, the access network device corresponding to the first RAT is the eNB, and the access network device corresponding to the second RAT is the gNB.

In 510, the UE registers with the 5G core network through NR.

In 520, the V2X application server sends broadcast configuration information to the UE.

In 530, a bearer for transmitting broadcast information is established between the V2X application server and the eNB.

In 540, the SMF sends a notification message to the AMF.

It should be understood that, the implementations of 510-540 are the same as the implementations of 410-420 in FIG. 4, which is not described herein.

In 550, the AMF determines whether the UE is in a connected state, and if the UE is in a connected state, the AMF sends a NAS message to the UE, and the NAS message carries the instruction information.

In 560, the UE sends a Service Request to the AMF.

If the UE can currently receive broadcast information, the UE may send a Service Request to the AMF to inform the AMF that the UE can receive broadcast information.

In 570, the AMF sends switching information to the gNB.

Where, the switching information may be used to instruct the gNB to switch the UE to the area of the eNB.

After receiving the Service Request, the AMF may send the switching information to the gNB to instruct the gNB to switch the UE to the eNB.

In 580, the gNB triggers the UE to switch.

Specifically, after receiving the switching information, the gNB may send measurement configuration information to the UE, and the measurement configuration information may include measurement parameters that the UE performs cell measurement. After receiving the measurement configuration information, the UE may measure, according to the measurement parameters, the eNB in the area where broadcast information can be received to obtain a measurement result. After that, the UE reports the measurement result to the gNB, and the gNB may select a target cell based on the measurement result, so that the gNB can switch the UE to the eNB.

In the embodiment of the present disclosure, when the terminal device accesses the same core network through access network devices corresponding to multiple RATs, the terminal device can determine, through the instruction information, the access network device used to communicate with the network device, among multiple access network devices, thereby realizing the communication between the terminal device and the network side. In addition, the access network device is selected from multiple access network devices, which improves the flexibility of the communication between the terminal device and the network side.

FIG. 6 is a schematic flowchart of a communication method 600 according to an embodiment of the present disclosure. The method 600 includes at least part of the following content.

In 610, a core network device sends instruction information to a terminal device, where the instruction information is used to instruct the terminal device to communicate with network side through an access network device corresponding to a first RAT.

Where, the core network device is connected to access network devices corresponding to at least two RATs, and the at least two RATs include the first RAT.

As an example, the core network device may be an application server, a V2X CF or a PCF.

As an example, the core network device may be an AMF.

When the core network device is an AMF, in an implementation, the core network device sends instruction information to the terminal device, which may include: the AMF receives the instruction information sent by a SMF, and the AMF sends the instruction information to the terminal device through at least one access network device.

In an implementation, the at least one access network device may include the access network device corresponding to the first RAT.

In an implementation, the at least one access network device indicates all access network devices corresponding to the first RAT or all access network devices, in a registration area of the terminal device.

In the embodiment of the present disclosure, the method may further include: when a RAT corresponding to an access network device currently serving the terminal device is not the first RAT, the AMF sends switching information to the access network device currently serving the terminal device, and the switching information is used to instruct the access network device currently serving the terminal device to trigger the terminal device to switch from the access network device serving the terminal device to the access network device corresponding to the first RAT.

In an implementation, the instruction information may be included in a paging message or a NAS message.

In the embodiment of the present disclosure, the method may further include: the core network device sends a message to the terminal device, where the message sent by the core network device may be used to indicate an area where the terminal device communicates with the network side by using the access network device corresponding to the first RAT. Where, the network side device may be an application server.

In an implementation, the message sent by the core network device may include the instruction information.

It should be understood that, the terminal device receives from the core network device, which means that the core network device have performed transmission. The specific implementation of the method 600 may refer to the implementation of the method 300, which will not be described herein.

Figure 7:
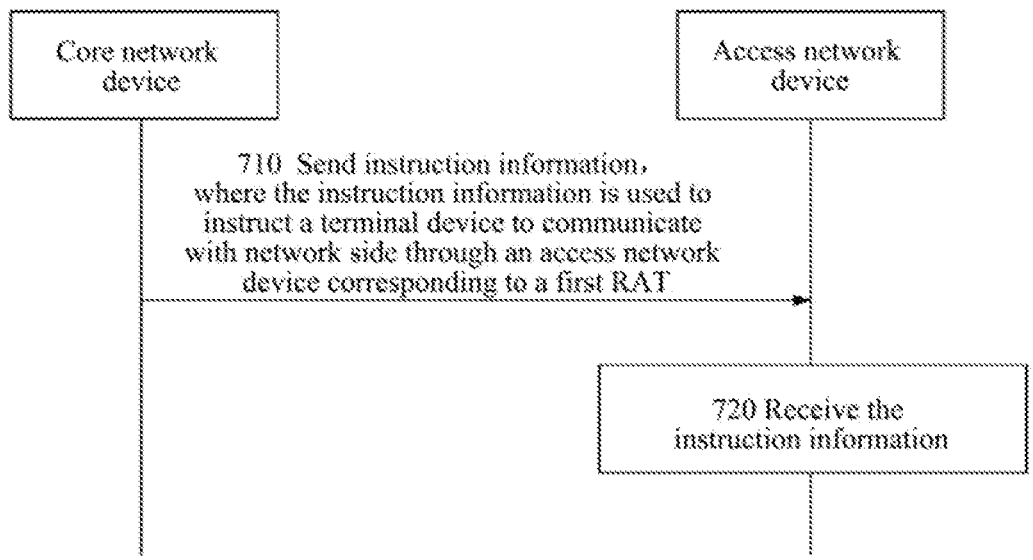
FIG. 7 is a schematic flowchart of a communication method according to an embodiment of the present disclosure.

FIG. 7 is a schematic flowchart of a communication method 7M according to an embodiment of the present disclosure. The method 700 includes at least part of the following content.

In 710, a core network device sends instruction information to an access network device, where the instruction information is used to instruct a terminal device to communicate with network side through an access network device corresponding to a first RAT.

Where, the core network device is connected to access network devices corresponding to at least two RATs, and the at least two RATs include the first RAT.

In an implementation, the instruction information is included in a paging message.

In an implementation, the access network device indicates all access network devices corresponding to the first RAT or all access network devices, in a registration area of the terminal device.

In an implementation, when the terminal device is in a connected state, the access network device is an access network device corresponding to a RAT other than the first RAT.

In the embodiment of the present disclosure, the method may further include: the core network device sends a message to the access network device, and the message is used to indicate an area where the terminal device communicates with the network side.

In an implementation, the message sent by the core network device may include the instruction information.

In 720, the access network device receives the instruction information sent by the core network device.

It should be understood that, the specific implementation of the method 700 can refer to the implementation of the method 300, which will not be described herein.

It should also be understood that, in the various embodiments of the present disclosure, the sequence number of the above-mentioned processes does not mean the order of execution, the execution order of each process should be determined by its function and internal logic, and should not constitute any limitation to the implementation of the embodiments of the present disclosure.

The communication methods according to the embodiments of the present disclosure are described in detail above, the devices according to the embodiments of the present disclosure are described below with reference to FIG. 8 and FIG. 9, and the technical features described in the method embodiments are applicable to the following device embodiments.

Figure 8:
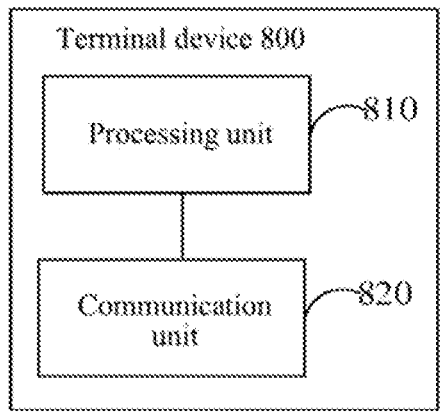
FIG. 8 is a schematic block diagram of a terminal device according to an embodiment of the present disclosure.

FIG. 8 shows a schematic block diagram of a terminal device 800 according to an embodiment of the present disclosure. As is shown in FIG. 8, the terminal device 800 includes:

a processing unit 810, configured to obtain instruction information, where the instruction information is sent by a core network device to the terminal device 800, or the instruction information is pre-configured on the terminal device 800, where the instruction information is used to instruct the terminal device 800 to communicate with network side through an access network device corresponding to a first RAT, where the core network device is connected to access network devices corresponding to at least two RATs, the terminal device 800 supports the at least two RATs, and the at least two RATs include the first RAT; and a communication unit 820, configured to communicate with the network side by using the access network device corresponding to the first RAT.

In the embodiment of the present disclosure, the communication unit 820 is specifically configured to communicate with the network side by using the access network device corresponding to the first RAT while maintaining communication with an access network device corresponding to a second RAT, where the at least two RATs include the second RAT.

In the embodiment of the present disclosure, a frequency band used for communication with the access network device corresponding to the second RAT is different from a frequency band used for communication with the access network devices corresponding to the first RAT.

In the embodiment of the present disclosure, if the instruction information is sent by the core network device to the terminal device 80, the instruction information is included in a paging message.

In the embodiment of the present disclosure, the paging message is from the access network device corresponding to the first RAT.

In the embodiment of the present disclosure, if the instruction information is sent by the core network device to the terminal device 800, the instruction information is included in a NAS message sent by the core network device.

In the embodiment of the present disclosure, the communication unit 820 is specifically configured to only select the access network device corresponding to the first RAT to communicate with the network side after the processing unit 810 obtains the instruction information.

In the embodiment of the present disclosure, the processing unit 810 is further configured to determine an area for communicating with the network side, and the area includes at least one access network device corresponding to the first RAT.

In the embodiment of the present disclosure, the communication unit 820 is specifically configured to communicate with the network side by using one of the at least one access network device.

In the embodiment of the present disclosure, the processing unit 810 is specifically configured to determine the area based on pre-configuration or a message from the core network device.

In an implementation, the message from the core network device further includes the instruction information.

It should be understood that, the terminal device 800 may correspond to the terminal device in the method 300, and can implement the corresponding operations of the terminal device in the method 300. For the sake of brevity, details are not described herein.

Figure 9:
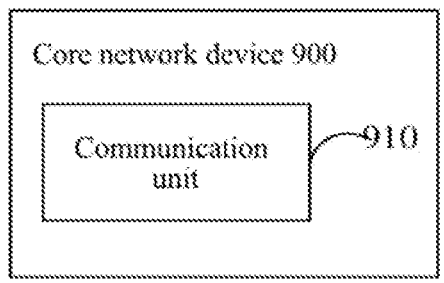
FIG. 9 is a schematic block diagram of a core network device according to an embodiment of the present disclosure.

FIG. 9 shows a schematic block diagram of a core network device 900 according to an embodiment of the present disclosure.

As is shown in FIG. 9, the core network device 900 includes:

a communication unit 910, configured to send instruction information to a terminal device, and the instruction information is used to instruct the terminal device to communicate with network side through an access network device corresponding to a first RAT, where, the core network device 900 is connected to access network devices corresponding to at least two RATs, and the at least two RATs include the first RAT.

In the embodiment of the present disclosure, the core network device 90 is an AMF.

In the embodiment of the present disclosure, the communication unit 910 is specifically configured to: receive the instruction information sent by a SMF; and send the instruction information to the terminal device through at least one access network device.

In the embodiment of the present disclosure, the at least one access network device includes the access network device corresponding to the first RAT.

In the embodiment of the present disclosure, the at least one access network device indicates all access network devices corresponding to the first RAT or all access network devices, in a registration area of the terminal device.

In the embodiment of the present disclosure, the communication unit 910 is further configured to: when a RAT corresponding to an access network device currently serving the terminal device is not the first RAT, send switching information to the access network device currently serving the terminal device, and the switching information is used to instruct the access network device currently serving the terminal device to trigger the terminal device to switch from the access network device currently serving the terminal device to the access network device corresponding to the first RAT.

In the embodiment of the present disclosure, the instruction information may be included in a paging message or the instruction information may be included in a NAS message.

In the embodiment of the present disclosure, the communication unit 910 is further configured to: send a message to the terminal device, and the message is used to indicate the area where the terminal device communicates with the network side. In an implementation, the network side device is an application server.

In the embodiment of the present disclosure, the message further includes the instruction information.

It should be understood that, the core network device 900 may correspond to the core network device in the method 600, and can implement the corresponding operations of the core network device in the method 600. For the sake of brevity, the details are not described herein.

In the embodiment of the present disclosure, the communication unit 910 is further configured to send instruction information to an access network device, and the instruction information is used to instruct a terminal device to communicate with network side through an access network device corresponding to a first RAT.

Where, the core network device 900 is connected to access network devices corresponding to at least two RATs, and the at least two RATs include the first RAT.

In the embodiment of the present disclosure, the instruction information is included in a paging message.

In the embodiment of the present disclosure, the access network device indicates all access network devices corresponding to the first RAT or all access network devices, in a registration area of the terminal device.

In the embodiment of the present disclosure, when the terminal device is in a connected state, the access network device is an access network device corresponding to a RAT other than the first RAT.

In the embodiment of the present disclosure, the communication unit 910 is further configured to: send a message to the access network device, and the message is used to indicate an area where the terminal device communicates with the network side.

In the embodiment of the present disclosure, the message further includes the instruction information.

It should be understood that, the core network device 900 may correspond to the core network device in the method 700, and can implement the corresponding operations of the core network device in the method 700. For the sake of brevity, the details are not described herein.

Figure 10:
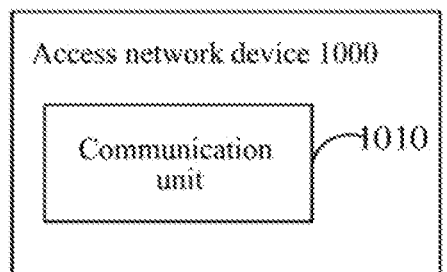
FIG. 10 is a schematic block diagram of an access network device according to an embodiment of the present disclosure.

FIG. 10 shows a schematic block diagram of an access network device 1000 according to an embodiment of the present disclosure. As shown in FIG. 10, the access network device 1000 includes:

a communication unit 1010, configured to receive instruction information sent by a core network device, and the instruction information is used to instruct a terminal device to communicate with network side through an access network device corresponding to a first RAT.

Where the core network device is connected to access network devices corresponding to at least two RATs, and the at least two RATs include the first RAT.

In the embodiment of the present disclosure, the instruction information is included in a paging message.

In the embodiment of the present disclosure, the access network device 1000 is all access network devices corresponding to the first RAT or all access network devices, in a registration area of the terminal device.

In the embodiment of the present disclosure, when the terminal device is in a connected state, the access network device 1000 is an access network device corresponding to a RAT other than the first RAT.

In the embodiment of the present disclosure, the communication unit 1010 is further configured to: receive a message sent by the core network device, and the message is used to indicate an area where the terminal device communicates with the network side.

In the embodiment of the present disclosure, the message further includes the instruction information.

It should be understood that, the access network device 1100 may correspond to the access network device in the method 700, and can implement the corresponding operations of the access network device in the method 700. For the sake of brevity, the details are not described herein.

Figure 11:
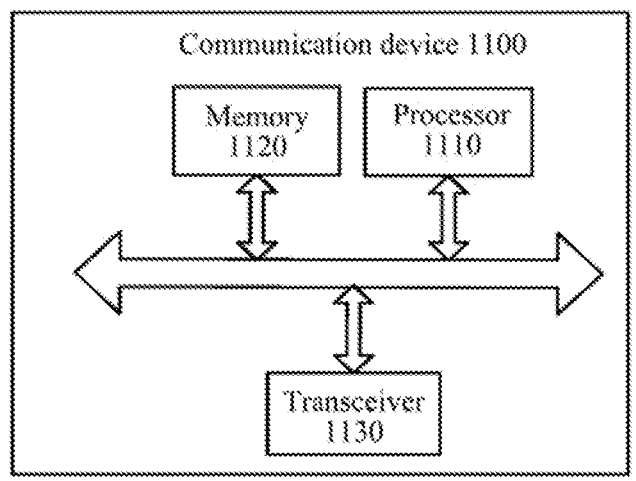
FIG. 11 is a schematic block diagram of a communication device according to an embodiment of the present disclosure.

FIG. 11 is a schematic structural diagram of a communication device 1100 according to an embodiment of the present disclosure. The communication device 1100 shown in FIG. 11 includes a processor 1110, and the processor 1110 can call a computer program from a memory and run the computer program to implement the methods in the embodiments of the present disclosure.

In an implementation, as shown in FIG. 1, the communication device 1100 may further include a memory 1120. Where, the processor 1110 may call a computer program from the memory 1120 and run the computer program to implement the methods in the embodiments of the present disclosure.

Where, the memory 1120 may be a separate device independent from the processor 1110, or may be integrated in the processor 1110.

In an implementation, as shown in FIG. 11, the communication device 1100 may further include a transceiver 1130, and the processor 1110 may control the transceiver 1130 to communicate with other device, specifically, the processor 1110 may control the transceiver 1130 to send information or data to other device, or receive information or data sent by other device.

Where, the transceiver 1130 may include a transmitter and a receiver. The transceiver 1130 may further include an antenna, and the number of the antenna may be one or more.

In an implementation, the communication device 1100 may specifically be the terminal device of the embodiment of the present disclosure, and the communication device 1100 can implement the corresponding process implemented by the terminal device in each method of the embodiment the present disclosure. For the sake of brevity, the details are not described herein.

In an implementation, the communication device 1100 may specifically be the core network device of the embodiment of the present disclosure, and the communication device 1100 may implement the corresponding process implemented by the core network device in each method of the embodiment of the present disclosure. For the sake of brevity, the details are not described herein.

In an implementation, the communication device 1100 may specifically be the access network device of the embodiments of the present disclosure, and the communication device 1100 may implement the corresponding process implemented by the access network device in each method of the embodiment of the present disclosure. For the sake of brevity, the details are not described herein.

Figure 12:
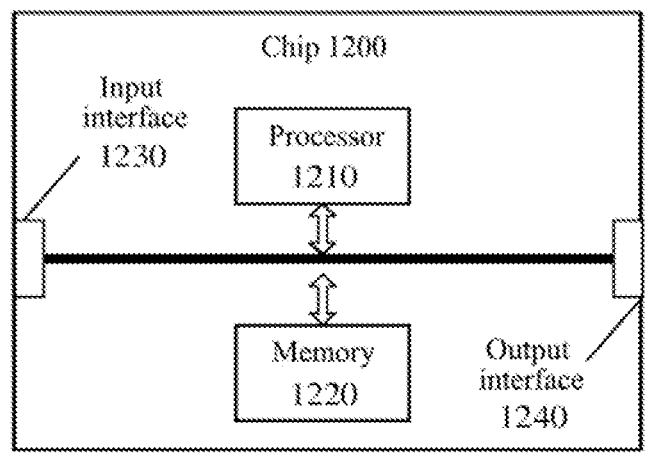
FIG. 12 is a schematic block diagram of a chip according to an embodiment of the present disclosure.

FIG. 12 is a schematic structural diagram of a chip of an embodiment of the present disclosure. The chip 1200 shown in FIG. 12 includes a processor 1210, and the processor 1210 can call a computer program from a memory and run the computer program to implement the method in the embodiment of the present disclosure.

In an implementation, as shown in FIG. 12, the chip 1200 may further include a memory 1220. Where, the processor 1210 can call a computer program from the memory 1220 and run the computer program to implement the method in the embodiment of the present disclosure.

Where, the memory 1220 may be a separate device independent from the processor 1210, or may be integrated in the processor 1210.

In an implementation, the chip 1200 may further include an input interface 1230. Where, the processor 1210 may control the input interface 1230 to communicate with other device or chip, specifically, the processor 1210 may control the input interface 1230 to obtain information or data sent by other device or chip.

In an implementation, the chip 1200 may further include an output interface 1240. Where, the processor 1210 may control the output interface 1240 to communicate with other device or chip, specifically, the processor 1210 may control the output interface 1240 to output information or data to other device or chip.

In an implementation, the chip may be applied to the terminal device in the embodiment of the present disclosure, and the chip can implement the corresponding process implemented by the terminal device in each method of the embodiment of the present disclosure. For the sake of brevity, the details are not described herein.

In an implementation, the chip may be applied to the core network device in the embodiment of the present disclosure, and the chip can implement the corresponding process implemented by the core network device in each method of the embodiment of the present disclosure. For the sake of brevity, the details are not described herein.

In an implementation, the chip may be applied to the access network device in the embodiment of the present disclosure, and the chip can implement the corresponding process implemented by the access network device in each method of the embodiment of the present disclosure. For the sake of brevity, the details are not described herein.

It should be understood that, the chip mentioned in the embodiment of the present disclosure may also be referred to as a system-level chip, a system chip, a chip system, or a system-on-chip, etc.

It should be understood that the processor of the embodiment of the present disclosure may be an integrated circuit chip with signal processing capability. In the implementation process, the steps of the above-mentioned method embodiments may be completed by hardware integrated logic circuits in the processor or instructions in the form of software. The above-mentioned processor may be a general-purpose processor, a digital signal processor (DSP), an application specific integrated circuit (ASIC), a field programmable gate array (FPGA), or other programmable logic device, discrete gate or transistor logic device, discrete hardware component. The methods, steps, and logical block diagrams disclosed in the embodiments of the present disclosure can be implemented or performed. The general-purpose processor may be a microprocessor or the processor may also be any conventional processor etc. The steps of the methods disclosed in the embodiments of the present disclosure may be directly embodied as being performed and completed by a hardware decoding processor, or performed and completed by a combination of hardware and software modules in the decoding processor. The software modules may be located in a mature storage medium in the field such as a random-access memory, a flash memory, a read-only memory, a programmable read-only memory, or an electrically erasable programmable memory, a register and so on. The storage medium is located in a memory, and a processor reads the information in the memory and completes the steps of the above methods in combination with tits hardware.

It can be understood that the memory in the embodiments of the present disclosure may be a volatile memory or a non-volatile memory, or may include both the volatile and the non-volatile memory. Where, the non-volatile memory may be a read-only memory (ROM), a programmable ROM (PROM), an erasable PROM (EPROM), an electrically EPROM (EEPROM) or a flush memory. The volatile memory may be a random access memory (Random Access Memory, RAM), which is used as an external cache. Through exemplary but not restrictive description, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that the memory of the system and the method described herein is intended to include, but is not limited to, these memories and any other suitable types of memories.

It should be understood that the above-mentioned memories are exemplary but not restrictive, for example, the memory in the embodiments of the present disclosure may also be a static RAM (RAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM), etc. That is to say, the memory in the embodiments of the present disclosure is intended to include, but is not limited to, these memories and any other suitable types of memories.

Figure 13:
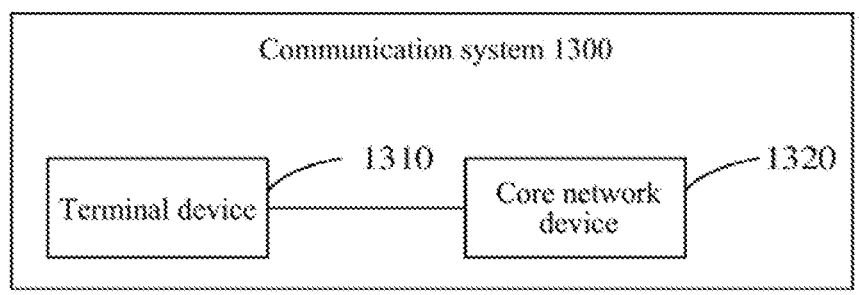
FIG. 13 is a schematic block diagram of a communication system according to an embodiment of the present disclosure.

FIG. 13 is a schematic block diagram of a communication system 1300 according to an embodiment of the present disclosure. As shown in FIG. 13, the communication system 1300 includes a terminal device 1310 and a core network device 1320.

Where, the terminal device 1310 may be used to implement the corresponding functions implemented by the terminal device in the above methods, and the core network device 1320 may be used to implement the corresponding functions implemented by the core network device in the above methods. For the sake of brevity, the details are not described herein.

Figure 14:
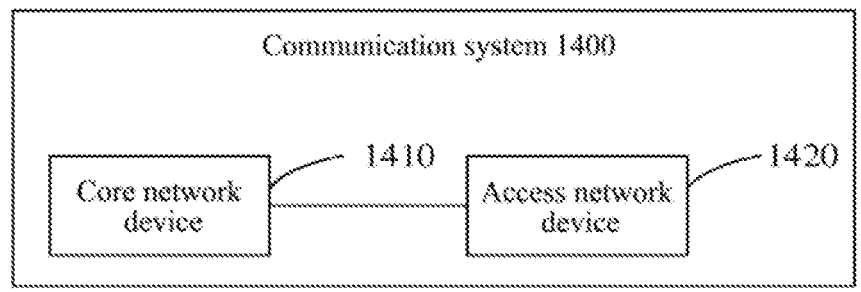
FIG. 14 is a schematic block diagram of a communication system according to an embodiment of the present disclosure.

FIG. 14 is a schematic block diagram of a communication system 1400 according to an embodiment of the present disclosure.

As is shown in FIG. 14, the communication system 1400 includes a core network device 1410 and an access network device 1420.

Where, the core network device 1410 may be used to implement the corresponding functions implemented by the core network device in the above methods, and the access network device 1420 may be used to implement the corresponding functions implemented by the access network device in the above methods. For the sake of brevity, the details are not described herein.

The embodiment of the present disclosure further provides a computer-readable storage medium, which is used to store a computer program.

In an implementation, the computer-readable storage medium may be applied to the terminal device in the embodiment of the present disclosure, and the computer program causes a computer to execute the corresponding process implemented by the terminal device in each method of the embodiments of the present disclosure. For the sake of brevity, the details are not described herein.

In an implementation, the computer-readable storage medium may be applied to the core network device in the embodiment of the present disclosure, and the computer program causes a computer to execute the corresponding process implemented by the core network device in each method of the embodiments of the present disclosure. For the sake of brevity, the details are not described herein.

In an implementation, the computer-readable storage medium may be applied to the access network device in the embodiment of the present disclosure, and the computer program causes a computer to execute the corresponding process implemented by the access network device in each method of the embodiments of the present disclosure. For the sake of brevity, the details are not described herein.

The embodiment of the present disclosure further provides a computer program product, including computer program instructions.

In an implementation, the computer program product may be applied to the terminal device in the embodiment of the present disclosure, and the computer program instructions causes a computer to execute the corresponding process implemented by the terminal device in each method of the embodiments of the present disclosure. For the sake of brevity, the details are not described herein.

In an implementation, the computer program product may be applied to the core network device in the embodiment of the present disclosure, and the computer program instructions causes a computer to execute the corresponding process implemented by the core network device in each method of the embodiments of the present disclosure. For the sake of brevity, the details are not described herein.

In an implementation, the computer program product may be applied to the access network device in the embodiment of the present disclosure, and the computer program instructions causes a computer to execute the corresponding process implemented by the access network device in each method of the embodiments of the present disclosure. For the sake of brevity, the details are not described herein.

The embodiment of the present disclosure further provides a computer program.

In an implementation, the computer program may be applied to the terminal device in the embodiment of the present disclosure, and the computer program causes a computer to execute the corresponding process implemented by the terminal device in each method of the embodiments of the present disclosure. For the sake of brevity, the details are not described herein.

In an implementation, the computer program may be applied to the core network device in the embodiment of the present disclosure, and the computer program causes a computer to execute the corresponding process implemented by the core network device in each method of the embodiments of the present disclosure. For the sake of brevity, the details are not described herein.

In an implementation, the computer program may be applied to the access network device in the embodiment of the present disclosure, and the computer program causes a computer to execute the corresponding process implemented by the access network device in each method of the embodiments of the present disclosure. For the sake of brevity, the details are not described herein.

Those of ordinary skill in the art may be aware that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals may use different methods for each specific application to implement the described functions, but such implementation should not be considered as being beyond the scope of the present disclosure.

Those skilled in the art can clearly understand that, for the convenience and conciseness of description, the specific working process of the above-described system, device, and unit may refer to the corresponding process in the precious method embodiments, which will not be described here.

In the several embodiments provided in the disclosure, it should be understood that the disclosed system, device, and method may be implemented in other ways. For example, the device embodiments described above are only illustrative. For example, the division of the units is only a division of logical functions, and there may be other divisions in actual implementation, for example, multiple units or components may be combined or integrated into another system, or some features may be omitted or not implemented. In addition, the displayed or discussed mutual coupling, direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, the components may be located in a place, or the components may be distributed to multiple network units. Some or all of the units may be selected according to actual needs to achieve the objectives of the solutions of the embodiments.

In addition, the functional units in each embodiment of the present disclosure may be integrated into one processing unit, or each unit may exist alone physically, or two or more units may be integrated into one unit.

If the functions are implemented in the form of a software functional unit and sold or used as an independent product, it can be stored in a computer readable storage medium. Based on such understanding, the technical solutions of this disclosure essentially or the part that contributes to the existing technology or the part of the technical solution may be embodied in the form of a software product. The computer software product is stored in a storage medium and includes several instructions which are used to cause a computer device (which may be a personal computer, a server, or a network device, etc.) to perform all or part of the steps of the methods described in the various embodiments of the present disclosure. The above-mentioned storage medium includes: a U disk, a mobile hard disk, a read-only memory (Read-Only Memory, ROM), a random access memory (Random Access Memory, RAM), a magnetic disk, an optical disk or other medium that can store program codes.

The above are only specific implementations of the present disclosure, but the protection scope of the present disclosure is not limited to this. With the technical scope disclosed in the present disclosure, the changes or substitutions that can be easily thought of by anyone skilled in the art should be covered in the protection scope of the present disclosure. Therefore, the protection scope of the present disclosure should be subject to the protection scope of the claims.

What is claimed is:

1. A communication method, comprising:
obtaining, by a terminal device, instruction information sent by a core network device, wherein the instruction information is used to instruct the terminal device to communicate with network side through an access network device corresponding to a first radio access technology (RAT), and wherein the instruction information is carried in a broadcast configuration message and the broadcast configuration message comprises an area where the terminal device communicates with the network side, wherein the area refers to an area where the terminal device receives broadcast information by using the access network device corresponding to the first RAT; and communicating, by the terminal device, with the network side by using the access network device corresponding to the first RAT;

wherein, the terminal device supports Internet of Things (IoT) services and supports communication with the core network device through at least two RATs, and the at least two RATs comprise the first RAT and a second RAT, wherein the first RAT is an evolved universal terrestrial radio access network (E-UTRAN);

wherein the communicating, by the terminal device, with the network side by using the access network device corresponding to the first RAT comprises:

after obtaining the instruction information, only using the access network device corresponding to the first RAT to communicate with the network side.

2. The method according to claim 1, wherein the communicating, by the terminal device, with the network side by using the access network device corresponding to the first RAT comprises:

communicating, by the terminal device, with the network side by only using the access network device corresponding to the first RAT when the terminal device maintains communication with an access network device corresponding to the second RAT.

3. The method according to claim 2, wherein a frequency band in which the terminal device communicates with the access network device corresponding to the second RAT is different from a frequency band in which the terminal device communicates with the access network device corresponding to the first RAT.

4. The method according to claim 1, wherein the communicating, by the terminal device, with the network side by using the access network device corresponding to the first RAT comprises:

determining, by the terminal device, the area where the terminal device receives the broadcast information, wherein the area comprises at least one access network device corresponding to the first RAT; and receiving, by the terminal device, the broadcast information by using one of the at least one access network device.

5. The method according to claim 4, wherein the determining, by the terminal device, the area where the terminal device receives the broadcast information comprises:

determining, by the terminal device, the area based on the broadcast configuration message.

6. The method according to claim 1, wherein the core network device is an access and mobility management function (AMF).

7. A terminal device, comprising: a processor and a memory, wherein the memory is configured to store a computer program, and the processor is configured to call and run the computer program stored in the memory to:

obtain instruction information sent by a core network device, wherein the instruction information is used to instruct the terminal device to communicate with network side through an access network device corresponding to a first radio access technology (RAT), and wherein the instruction information is carried in a broadcast configuration message and the broadcast configuration message comprises an area where the terminal device communicates with the network side, wherein the area refers to an area where the terminal device receives broadcast information by using the access network device corresponding to the first RAT; and after the processor obtains the instruction information, only use the access network device corresponding to the first RAT to communicate with the network side;

wherein, the terminal device supports Internet of Things (IoT) services and supports at least two RATs, and the at least two RATs comprise the first RAT and a second RAT, wherein the first RAT is an evolved universal terrestrial radio access network (E-UTRAN).

8. The terminal device according to claim 7, wherein the processor is configured to call and run the computer program stored in the memory to:

communicate with the network side by only using the access network device corresponding to the first RAT when maintaining communication with an access network device corresponding to the second RAT.

9. The terminal device according to claim 8, wherein a frequency band used for communication with the access network device corresponding to the second RAT is different from a frequency band used for communication with the access network device corresponding to the first RAT.

10. The terminal device according to claim 7, wherein the processor is configured to call and run the computer program stored in the memory to:

determine the area for receiving the broadcast information, wherein the area comprises at least one access network device corresponding to the first RAT; and receive the broadcast information by using one of the at least one access network device.

11. The terminal device according to claim 7, wherein the core network device is an access and mobility management function (AMF).

12. A core network device, comprising: a processor and a memory, wherein the memory is configured to store a computer program, and the processor is configured to call and run the computer program stored in the memory to:

send instruction information to a terminal device, wherein the instruction information is used to instruct the terminal device to communicate with network side through an access network device corresponding to a first radio access technology (RAT), and wherein the instruction information is carried in a broadcast configuration message and the broadcast configuration message comprises an area where the terminal device communicates with the network side, wherein the area refers to an area where the terminal device receives broadcast information by using the access network device corresponding to the first RAT, wherein the terminal device supports Internet of Things (IoT) services and supports communication with the core network device through at least two RATs, and the at least two RATs comprise the first RAT and a second RAT, and the first RAT is an evolved universal terrestrial radio access network (E-UTRAN).

13. The core network device according to claim 12, wherein the core network device is an access and mobility management function (AMF).

* * * * *